United States Patent
Tada et al.

(10) Patent No.: US 9,575,284 B2
(45) Date of Patent: Feb. 21, 2017

(54) DRIVING MEMBER, LINEAR DRIVING DEVICE, CAMERA DEVICE, AND ELECTRONIC DEVICE

(71) Applicant: New Shicoh Technology Co., Ltd., Yamato (JP)

(72) Inventors: Junichi Tada, Yamato (JP); Manabu Shiraki, Yamato (JP)

(73) Assignee: NEW SHICOH TECHNOLOGY CO., LTD., Yamato, Kanagawa Pref. (JP)

( * ) Notice: Subject to any disclaimer, the term of this patent is extended or adjusted under 35 U.S.C. 154(b) by 303 days.

(21) Appl. No.: 14/295,655

(22) Filed: Jun. 4, 2014

(65) Prior Publication Data
US 2014/0362280 A1 Dec. 11, 2014

(30) Foreign Application Priority Data

Jun. 6, 2013 (JP) .................................. 2013-119948

(51) Int. Cl.
*H02N 2/00* (2006.01)
*G02B 7/04* (2006.01)
(Continued)

(52) U.S. Cl.
CPC .................. *G02B 7/04* (2013.01); *G02B 7/10* (2013.01); *H04N 5/2257* (2013.01); *H04N 5/2254* (2013.01)

(58) Field of Classification Search
CPC ....... G02B 7/04; H02N 2/025; H01L 41/0973
(Continued)

(56) References Cited

U.S. PATENT DOCUMENTS

| 7,498,719 B2 * | 3/2009 | Piotr | H02N 2/025 |
| | | | 310/328 |
| 8,466,602 B2 * | 6/2013 | Shiraki | G02B 7/102 |
| | | | 310/313 R |

(Continued)

FOREIGN PATENT DOCUMENTS

| GB | 2 149 570 A | 6/1985 |
| JP | S58-27387 A | 2/1983 |

(Continued)

OTHER PUBLICATIONS

Office Action (Notification of Reasons for Refusal) issued on Oct. 18, 2016, by the Japanese Patent Office in corresponding Japanese Patent Application No. 2013-119948 and an English translation of the Office Action. (9 pages).

*Primary Examiner* — J. San Martin
(74) *Attorney, Agent, or Firm* — Buchanan Ingersoll & Rooney PC

(57) ABSTRACT

A driving member, a linear driving device using the driving member, a camera device and an electronic device are provided. The driving member (10) includes a deformable thin plate (16) having a flexible thin plate (12) capable of expanding and contracting itself under the applied voltage and an elastic thin plate (14) having at least one side thereof rigidly fixed to the flexible thin plate (12) and a driving shaft (30) having its one axial end rigidly fixed to the deformable thin plate (16) and being capable of undergoing displacements that are operatively associated with the deformation of the deformable thin plate (16), wherein the driving shaft (30) has the lateral side portion (32) of the one axial end thereof rigidly fixed to the corresponding inner side portion of a through hole formed on the deformable thin plate (16).

9 Claims, 6 Drawing Sheets

(51) Int. Cl.
*G02B 7/10* (2006.01)
*H04N 5/225* (2006.01)

(58) Field of Classification Search
USPC .......................................................... 310/323
See application file for complete search history.

(56) References Cited

U.S. PATENT DOCUMENTS

| | | | |
|---|---|---|---|
| 2005/0258715 A1 | 11/2005 | Schlabach | |
| 2007/0120442 A1 | 5/2007 | Piotr et al. | |
| 2008/0196815 A1* | 8/2008 | Yamada | G02B 7/102 |
| | | | 156/60 |
| 2008/0315721 A1* | 12/2008 | Wada | H02N 2/025 |
| | | | 310/323.02 |
| 2009/0256948 A1* | 10/2009 | Wu | G02B 7/102 |
| | | | 348/340 |
| 2010/0038995 A1* | 2/2010 | Claeyssen | H02N 2/025 |
| | | | 310/323.02 |
| 2010/0073784 A1* | 3/2010 | Kanbe | G02B 7/102 |
| | | | 359/823 |
| 2013/0307373 A1* | 11/2013 | Inoue | H02N 2/025 |
| | | | 310/311 |
| 2015/0084484 A1* | 3/2015 | Tada | G06F 3/016 |
| | | | 310/334 |
| 2016/0056367 A1* | 2/2016 | Tada | G02B 7/102 |
| | | | 359/696 |

FOREIGN PATENT DOCUMENTS

| | | |
|---|---|---|
| JP | H08-281229 A | 10/1996 |
| JP | H09-37571 A | 2/1997 |
| JP | 2007-516688 A | 6/2007 |
| JP | 2011120414 A * | 6/2011 |
| JP | 2011125097 A * | 6/2011 |

\* cited by examiner

DRIVING MEMBER, LINEAR DRIVING DEVICE, CAMERA DEVICE, AND ELECTRONIC DEVICE

BACKGROUND OF THE INVENTION

Field of the Invention

The present invention relates to a driving member for use with a linear driving device that is employed in the camera or digital camera usually mounted on an electronic device such as the mobile phone and the like. The present invention also relates to a linear driving device, a camera device and an electronic device, each of which uses the driving member of the present invention.

Description of Relevant Art

In the conventional relevant art, the small-size camera device or the like employs the linear driving device (the lens driving device) that is designed for use in driving the lens mounted on the camera device. There are various types of the driving member that have been used with the linear driving device (the lens driving device).

As one example of the driving member, there has been a zooming or focusing type of the driving member that drives the lens support having the lens mounted thereon to be moved in the linear manner by vibrating the driving shaft in the axial direction thereof.

In this conventional type of driving member, structurally and constructionally, its driving shaft is usually coupled with a vibration producing source and the lens support is frictionally coupled with the driving shaft. The vibration producing source may produce vibrations that are supplied to the driving shaft to cause the driving shaft to reciprocate in the axial direction thereof and with different speeds depending on whether the driving shaft is moved forwardly or backwardly. In this way, the driving shaft and the lens support will be placed under the different friction conditions while the driving shaft is reciprocating under the supplied vibrations. Then, this will cause the lens support to move.

For example, Patent Document 1 discloses the structure of the driving member 100 in which the driving shaft 108 is coupled with a deformable thin plate 106 as shown in FIG. 6. The deformable thin plate 106 includes a piezoelectric base plate 102 and an elastic base plate 104 having one side or both sides thereof attached to the piezoelectric base plate 102. In the disclosed structure shown in FIG. 6, the piezoelectric base plate 102 is attached to the bottom side of the elastic base plate 104. The driving shaft 108 has its axial one end rigidly fixed to the deformable thin plate 106. In the disclosed structure shown in FIG. 6, the driving shaft has its axial bottom end rigidly fixed to the upper lateral side portion of an elastic base plate 104 forming the deformable thin plate 106.

The piezoelectric base plate 102 has its thickness that may expand or contract itself and also has its surface that may contract or expand itself, when the voltage is applied across the piezoelectric base plate 102. The elastic base plate 104 will not undergo such deformations, however. When the voltage is then applied across the piezoelectric base plate 102, the deformable thin plate 106 will be bent upwardly or downwardly just like the bimetal or will be restored to its original shape as shown in FIG. 6. The driving shaft 108, whose movement is operatively associated with the displacement that is caused by the deformable thin plate 106, will be vibrated upwardly and downwardly as shown in FIG. 6.

The elastic base plate 104 and the piezoelectric base plate 102 have the diameter of several mm or the square of several mm as they are viewed in plane from the axial direction of the driving shaft 108. The driving shaft 108 has the diameter of about one mm. The vibrations mentioned above have the amplitude of one μm to several μm and the frequency of several ten kHz.

Although it is not specifically described in Patent Document 1, it is the practice in the prior art that the axial end of the driving shaft 108 is rigidly fixed to the deformable thin plate 106 by means of any appropriate adhesive agent. In the prior art, it is the practice that the adhesive agent is applied between the surface of the deformable thin plate 106 on the side on which the driving shaft 108 is rigidly fixed to the deformable thin plate 106 and the driving shaft 108 as well as on the peripheral areas around them to ensure they can be fixed with stability.

Patent Document 1: Japanese patent No. 2007-516688 publication

SUMMARY

When the axial end of the driving shaft is rigidly fixed to the deformable thin plate by means of the appropriate adhesive agent, the prior art structure shown in FIG. 6, in which the appropriate adhesive agent is applied between the surface of the deformable thin plate on the side on which the driving shaft 108 is rigidly fixed and the driving shaft 108 as well as on the peripheral areas around them, has several points yet to be improved so that the driving shaft can provide the increased driving capability.

In light of the above problems associated with the prior art structure, one object of the present invention is to provide a driving member that permits the driving shaft to provide the increased driving capability, or more specifically, that allows the driving force and driving amount that can be obtained by vibrating the driving shaft as described above to be improved.

As it may be apparent from the foregoing description, another object of the present invention is to provide a linear driving device, a camera device and an electronic device, each of which uses the driving member that can improve the driving capability of the driving shaft as described above.

In order to solve the prior art problems described above, the driving member of the present invention comprises:

a deformable thin plate including a flexible thin plate capable of expanding and contracting itself under the applied voltage and an elastic thin plate having at least one side thereof rigidly fixed to said flexible thin plate; and a driving shaft having its one axial end rigidly fixed to said deformable thin plate and being capable of undergoing displacements which are operatively associated with the deformation of the deformable thin plate, wherein said driving shaft having said one axial end whose lateral side portion is rigidly fixed to the inner side portion of a through hole formed on said deformable thin plate.

Those objects can thus be attained as desired.

One of the advantages of the present invention is to provide the driving member that permits the driving shaft to provide the increased driving capability, or more specifically, that allows the driving force and driving amount that can be obtained by vibrating the driving shaft to be improved.

Another of the advantages of the present invention is to provide the linear driving device, the camera device and the electronic device, each of which uses the driving member that can improve the driving capability of the driving shaft as described above.

BEST MODES OF EMBODYING THE INVENTION

Figure 1:
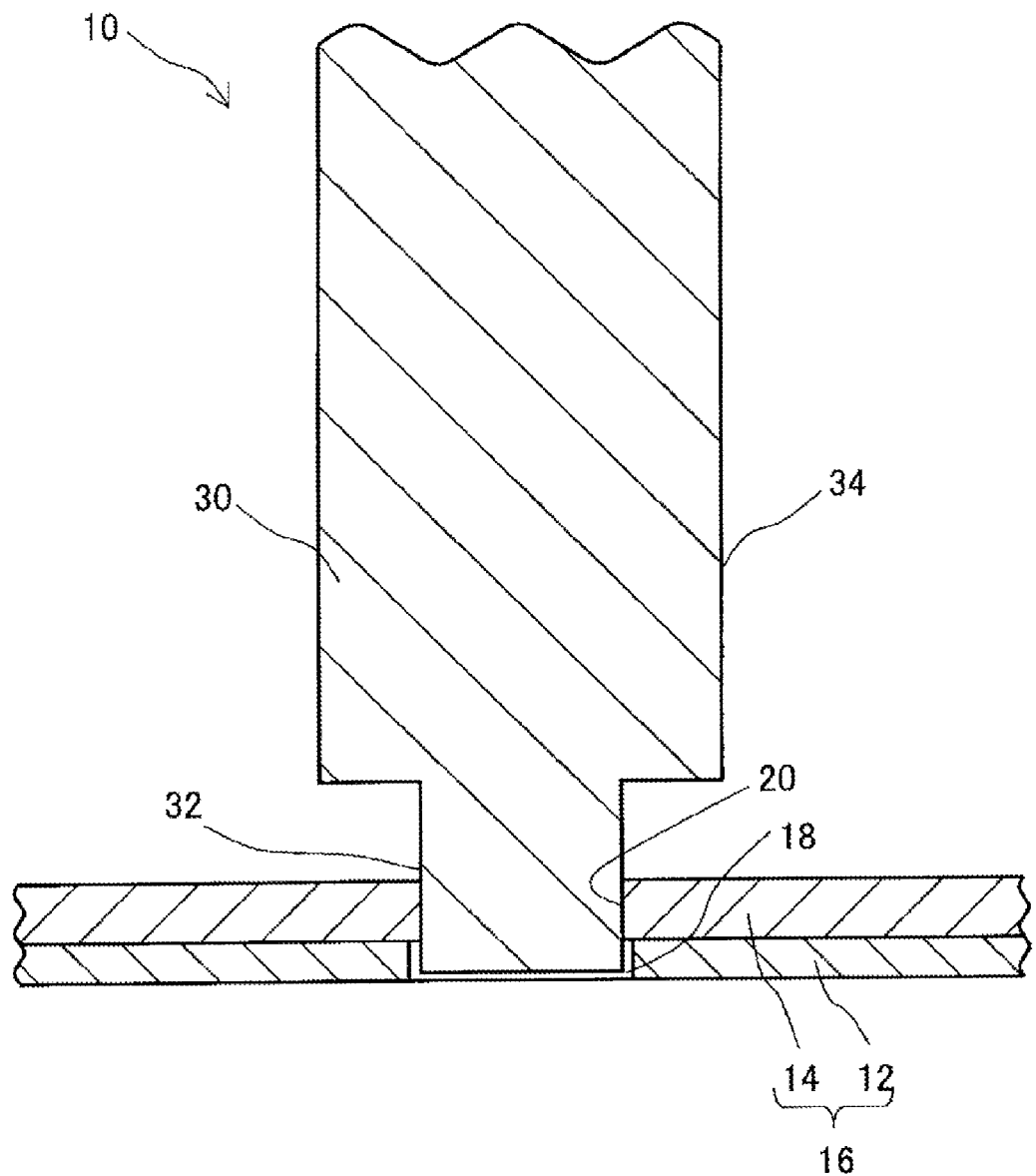
FIG. 1 is a sectional enlarged view of the driving member in accordance with one embodiment 1 of the present invention although some parts or elements are omitted.

Although the embodiments of the present invention will be described below by referring to the accompanying drawings, it should be understood that the present invention is not limited to the embodiments described below but the present invention may be modified in numerous ways without departing from the spirit and scope of the invention as defined in the appended claims.

(Embodiment 1)

The embodiment 1 of the present invention will be described by referring to the appropriate figures in the accompanying drawings.

A driving member 10 according to the embodiment 1 can be used with a linear driving device that may be incorporated in a camera or digital camera mounted on an electronic device such as the mobile phone and the like.

Firstly, the general description of the driving member 10 according to the embodiment 1 of the present invention is presented. The driving member 10 includes a deformable thin plate 16 and a driving shaft 30. The deformable thin plate 16 includes a flexible thin plate 12 that may expand and contract itself under the applied voltage and an elastic thin plate 14 having at least one side thereof rigidly fixed to the flexible thin plate 12. In the form of the driving member 10 shown, the elastic thin plate 14 has its bottom side rigidly fixed to the flexible thin plate 12.

The driving shaft 30 has its one axial end thereof rigidly fixed to the deformable thin plate 16, and its movement is operatively associated with the deformation that occurs in the deformable thin plate 16 so that the driving shaft 30 can be displaced in the axial direction thereof. In the embodiment 1 of the present invention, the deformable thin plate 16 has a through hole formed thereon, and the lateral side portion 32 of the bottom axial end of the driving shaft 30 is rigidly fixed to the corresponding inner side portion of the through hole.

In the example shown in FIG. 1, the through hole formed on the deformable thin plate 16 includes a first through hole 20 formed on the elastic thin plate 14 and a second through hole 18 formed on the flexible thin plate 12, those through holes being provided to communicate with each other. Specifically, the lateral side portion 32 of the bottom axial end of the driving shaft 30 is rigidly fixed to the corresponding inner side portion of the first through hole 20 formed on the elastic thin plate 14. Thus, the lateral side portion 32 of the bottom axial end of the driving shaft 30 may be rigidly fixed to the corresponding inner side portions of the first and second through holes formed on the deformable thin plate 16.

The flexible thin plate 12 may be made of any piezoelectric material or electrostriction material, and an electrode material may be attached to each of the sides of the flexible thin plate 12. The material that forms the electrode may contain copper, copper alloy and the like. The piezoelectric material or the electrostriction material may be a ceramic material selected from the group consisting of lead zirconate titanate, barium titanate and lead magnesium niobate, for example.

The flexible thin plate 12 may be formed like the disk-like shape or polygonal shape as it is viewed in plane from the axial direction, and the second through hole 18 forming one of the through holes formed on the deformable thin plate 16 may be located in the center. The second through hole 18 formed on the flexible thin plate 12 may have the diameter that is slightly larger than that of the first through hole 20 formed on the elastic thin plate 14, the details of which will be presented later.

The elastic thin plate 14 may be made of any elastic material such as copper, copper alloy and the like, for example. The elastic thin plate 14, in which the flexible thin plate 12 is provided on one side of the elastic thin plate 14 as shown in FIG. 1, has the external shape that corresponds to that of the flexible thin plate 12, and the first through hole 20 forming one of the through holes formed on the deformable thin plate 16 is located in the center.

The first through hole 20 formed on the elastic thin plate 14 has the size that corresponds to the external size of the lateral side portion 32 of the end of the driving shaft 30, the details of which will be presented later. It has the diameter that is slightly smaller than that of the through hole 18 formed on the flexible thin plate 12 as described above.

In the embodiment shown and described in which the flexible thin plate 12 is rigidly fixed to only one side of the elastic thin plate 14, the flexible thin plate 12 may be rigidly fixed to one side of the elastic thin plate 14 by means of any electrically conductive adhesive agent so that the first through hole 20 and the second through hole 18 can be aligned with each other.

Although this is not shown, the wires for applying the voltage across the flexible thin plate 12 are provided on each of both sides of the deformable thin plate 16.

The driving shaft 30 may be made of any material that has the light weight and high rigidity, such as the material selected from the carbon group, and has the column-like shape.

In the embodiment 1, the lateral side portion 32 of the end of the driving shaft 30 that is rigidly fixed to the corresponding inner side portions of the through holes formed on the deformable thin plate 16 has the diameter that is smaller than that of the lateral side portion 34 located in the center of the driving shaft 30. In an alternative embodiment, it is preferred that the lateral side portion 32 of the end of the driving shaft 30 may have the diameter that is equal to that of the lateral side portion 34 in the center of the driving shaft 30.

It is also preferred that the end of the driving shaft 30 located on the side opposite to the side on which the driving shaft 30 is rigidly fixed to the deformable thin plate 16 may remain to have the column-like edge as it is.

In the embodiment in which the lateral side portion 32 of the driving shaft 30 is made to be diametrically smaller than the corresponding lateral side portion 34 located in the center of the driving shaft 30 and having the usual thickness, it is preferred that the diametrically smaller lateral side portion 32 should have the length that is greater than the usual thickness of the deformable thin plate 16. In this way and structurally, it is preferred that the interface between the diametrically smaller lateral side portion 32 and the lateral side portion 34 having the usual thickness will not engage the deformable thin plate 16. The reason for which this structure is preferred is that the resulting driving force and driving amount would be lowered if that interface should engage the deformable thin plate 16.

In the following description, one example of how the driving member 10 will be assembled is presented.

A thin plate which is usually made of any piezoelectric material or electrostriction material is first prepared, and an electrode is then formed on each of both sides of the prepared thin plate. A second through hole 18 is formed on the thin plate and an flexible thin plate 12 is completed by cutting or press-cutting the thin plate into any desired size. It is preferred that the second through hole 18 should be formed together before the sintering process during the thin plate formation.

The flexible thin plate 12 thus obtained is then attached to an elastic thin plate 14 by means of the electrically conductive adhesive agent. The elastic thin plate 14 is then etched, and a first through hole 20 is formed on the elastic thin plate 14 so that the first through hole 20 can communicate with the second through hole 18 formed on the flexible thin plate 12.

A deformable thin plate 16 having the predetermined shape and including the through holes such that the first through hole 20 formed on the elastic thin plate 14 and the second through hole 18 formed on the flexible thin plate 12 can communicate with each other is thus completed.

As a preliminary step, a driving shaft 30 will have been formed into the desired shape using any material selected from the carbon group.

Then, the end portion of the driving shaft 30 that is diametrically smaller as described above is inserted through the through hole formed on the deformable thin plate 16, that is, through the first through hole 20 formed on the elastic thin plate 14. This permits the lateral side portion 32 of the end of the driving shaft 30 to be rigidly fixed to the corresponding inner side portion of the first through hole 20.

The one end of the driving shaft 30 may be rigidly fixed to the deformable thin plate 16 by the press fitting process.

During the press fitting process, it is preferred that an adhesive agent should be previously applied at least on the inner side portion of the first through hole 20 or on one side of the lateral side portions 32 of the end of the driving shaft 30 so that the driving shaft 30 can be fixed to the deformable thin plate more firmly.

After the press fitting process, it is also preferred that an adhesive agent should be poured between the lateral side portion 32 of the end of the driving shaft 30 and the inner side portion of the second through hole 18 on the flexible thin plate 12.

Furthermore, it is preferred that the so-called shrink fitting process may be employed, wherein the deformable thin plate 16 is previously heated in order to allow the first through hole 20 to be diametrically larger, and the driving shaft 30 is previously cooled in order to allow the lateral side portion 32 of the end to be diametrically smaller. In the shrink fitting process, the deformable thin plate 16 and the driving shaft 30 can be fitted together, and then can be fitted closely by allowing them to go back to the ambient temperature. It should be noted, however, that the shrink fitting process requires that the accurate temperature management should be made from the aspect of the fit tolerances.

It should also be noted that it is not required that the through hole on the deformable thin plate 16 and the corresponding lateral side portion 32 of the end the driving shaft 30 should have the same shape.

In the embodiment shown and described in FIG. 1, for example, it is preferred that the first through hole 20 may have the round shape while the lateral side portion 32 of the end of the driving shaft 30 may have the polygonal shape in cross section, the end of the driving shaft 30 may be press-fitted into the first through hole 20, and any appropriate adhesive agent may be filled in any gap that exists between them. Conversely, it is also preferred that the first through hole 20 may have the polygonal shape while the lateral side portion 32 of the end of the driving shaft 30 may have the round shape, the end of the driving shaft 30 may be press-fitted into the first through hole 20, and any appropriate adhesive agent may be filled in any gap that exists between them.

How the driving member 10 is operated to produce the driving capability is now described below in accordance with the embodiment 1 of the present invention.

In FIG. 1, the voltage with the particular waveform is applied across the flexible thin plate 12 in the deformable thin plate 16. The applied voltage waveform is the repetitive waveform such as the square waveform, the sawtooth waveform, the triangular waveform and the like.

When the voltage is applied until it reaches a predetermined voltage value, the flexible thin plate 12 will expand and contract itself in accordance with the particular voltage value. For example, it will become deformed so that its thickness can expand while its surface can contract.

Because the elastic thin plate 14 will not become deformed under the applied voltage, the deformable thin plate 16 will become deformed so that as shown in FIG. 1, its center portion can be bent upwardly like the bow shape and its peripheral areas can be bent downwardly like the bow shape.

As shown in FIG. 1, the driving shaft 30 will be displaced upwardly because its displacement is operatively associated with the deformation of its center area portion that involves the deformation of the deformable thin plate 16.

When the applied voltage is removed, that is, it is zero, the elastic thin plate 14 will provide its elastic force that attempts to restore the flexible thin plate 12 to its original state and/or the flexible thin plate 12 will become deformed back to its original state under the applied voltage of zero. The deformation of the flexible thin plate 12 will cause the deformable thin plate 14 to go back to its original state, causing the driving shaft 30 to go back to its original position.

The driving shaft 30 is operatively associated with the deformation of the deformable thin plate 16 as described above so that it can be vibrated with the amplitude of one µm to several µm and with the frequency of several ten kHz during its reciprocating movement.

The structure of the conventional prior art driving member as described above by using FIG. 1 is such that an adhesive agent 110 was applied between the surface of the side on which the driving shaft 108 was rigidly fixed to the deformable thin plate 106 and the driving shaft 108 as well as on the peripheral areas around them. Since the adhesive agent that existed in the gap between the driving shaft 108 and the deformable thin plate 106 might absorbed the deformation of the deformable plate 106, it might prevent the transmittance of the deformation of the deformable thin plate 106 as the vibrations to the driving shaft 108 sufficiently. The adhesive agent 110 might also prevent the deformable thin plate 106 from becoming deformed.

In the driving member 10 according to the embodiment 1, on the contrary, its structure is such that one axial end of the driving member 30 is rigidly fixed to the deformable thin plate 16 by fixing the lateral side portion 32 of the end of the driving shaft 30 to the corresponding inner side portion of the through hole formed on the deformable thin plate 16.

As such, the deformation amount of the deformable thin plate 16 can be transmitted to the driving shaft 30 as the substantially equal driving amount. Thus, the driving amount produced by the driving shaft 30 in the driving member 10 can be increased and the driving capability of the driving member 10 can be increased accordingly.

In the embodiment 1 described above in which the adhesive agent is used, the quantity of the adhesive agent that is used can be kept as small as possible. Thus, the adhesive agent will not prevent the deformation of the deformable thin plate 16. Even when the adhesive agent is used, therefore, the driving member 10 can allow the driving shaft 30 to provide the increased driving force and driving amount, and the driving member 10 can permits the increased driving capability.

In accordance with the embodiment 1 of the present invention, therefore, the driving member 10 can allow the driving shaft 30 to provide the improved driving capability as compared against the conventional prior art driving member 100. In other words, the driving force and the driving amount produced by vibrating the driving shaft 30 as described above can be increased considerably as compared against the conventional prior art driving member 100.

In the embodiment 1 of the present invention, it may be apparent from the foregoing description that the second through hole 18 formed on the flexible thin plate 12 is diametrically larger than the first through hole 20 formed on the elastic thin plate 14.

In the embodiment 1 shown in FIG. 1, it follows that even when the end of the driving shaft 30 is press-fitted into the through holes formed on the deformable thin plate 16 in order to fix the end of the driving shaft 30 to the deformable thin plate 16 securely, the end of the driving shaft 30 will not touch the inner side portions of the second through hole 18.

The elastic thin plate 12 having the second through hole 18 formed thereon is usually made of any appropriate ceramics material. For this reason, the elastic thin plate 12 is comparatively so fragile that it will be damaged easily when the end of the driving shaft 30 touches the inner side portion of the second through hole 18.

By using the structure of the embodiment 1, however, the above situation can be avoided. That is, the driving member 10 is manufactured so that the flexible thin plate 12 will not touch the end of the driving shaft 30. Thus, the damage will not occur on the flexible thin plate 12.

When the flexible thin plate 12 is made of any material that will not be damaged easily when the flexible thin plate 12 touches the end of the driving shaft 30, it is preferred that the second through hole 18 on the flexible thin plate 12 may have the same size as the first through hole 20 on the elastic thin plate 14. In this case, it is preferred that any appropriate process may be used to allow those through holes on both plates to be formed simultaneously.

In the embodiment 1 of the present invention, the driving shaft 30 will not protrude from the side opposite to the side on which the driving shaft 30 is rigidly fixed to the deformable thin plate 16 (the lower side surface of the flexible thin plate 12 in FIG. 1). There are no projections on the surface of the flexible thin plate 12, therefore.

If the end (forward end) of the driving shaft 30 should project from the lower side surface of the flexible thin plate 12 in FIG. 1, there is the risk that the end (forward end) of the driving shaft 30 will be damaged during its manufacture including its transport.

The structure according to the embodiment 1 of the present invention allows for the easy handling during the manufacture including the transport.

For the structure according to the embodiment 1, it is preferred that the end (forward end) of the driving shaft 30 including the lateral side portion 32 should be inserted from the side on which the elastic thin plate 14 is located. In other words, when the end of the driving shaft is inserted as described above, it is preferred that the structure should be such that the forward end of the driving shaft 30 will be fitted within the thickness of the flexible thin plate 12 and the driving shaft 30 will not project from the surface of the flexible thin plate 12 (the lower side surface of the flexible thin plate 12 in FIG. 1).

In accordance with the structure described above, there is no risk that the end (forward end) of the driving shaft 30 will be damaged during the manufacture including the transport, and the driving shaft 30 will be rigidly fixed to the deformable thin plate 16 in such manner that the fixing can occur over the whole thickness of the elastic thin plate 14 in which the inner side portion of the first through hole 20 engages the corresponding lateral side portion 32 of the driving shaft 30.

When the end of the driving shaft 30 is inserted from the side on which the flexible thin plate 12 is located, on the other hand, the driving shaft 30 will be rigidly fixed to the deformable thin plate 16 in such manner that in the region of the flexible thin plate 12, the inner side portion of the second through hole 18 will not engage the corresponding lateral side portion 32 of the driving shaft 30 and in the region of the elastic thin plate 14, the inner side portion of the first through hole 20 will engage the corresponding lateral side portion 32 of the driving shaft 30. If the driving shaft 30 is made not to project from the surface of the side opposite to the side on which the driving shaft 30 is rigidly fixed to the deformable thin plate 16, therefore, the lateral side portion 32 will only be rigidly fixed over the thickness of the elastic thin plate 14 at the most.

In order that the driving shaft 30 is fixed more firmly, it is preferred that the driving shaft 30 is inserted from the side on which the elastic thin plate 14 is located.

In the embodiment 1, the so-called unimorph is shown in which the deformable thin plate 16 includes the elastic thin plate 14 and the flexible thin plate 12 rigidly fixed to one side of the elastic thin plate 14. As an alternative example 1 shown in FIG. 2, the bimorph may also be provided.

Figure 2:
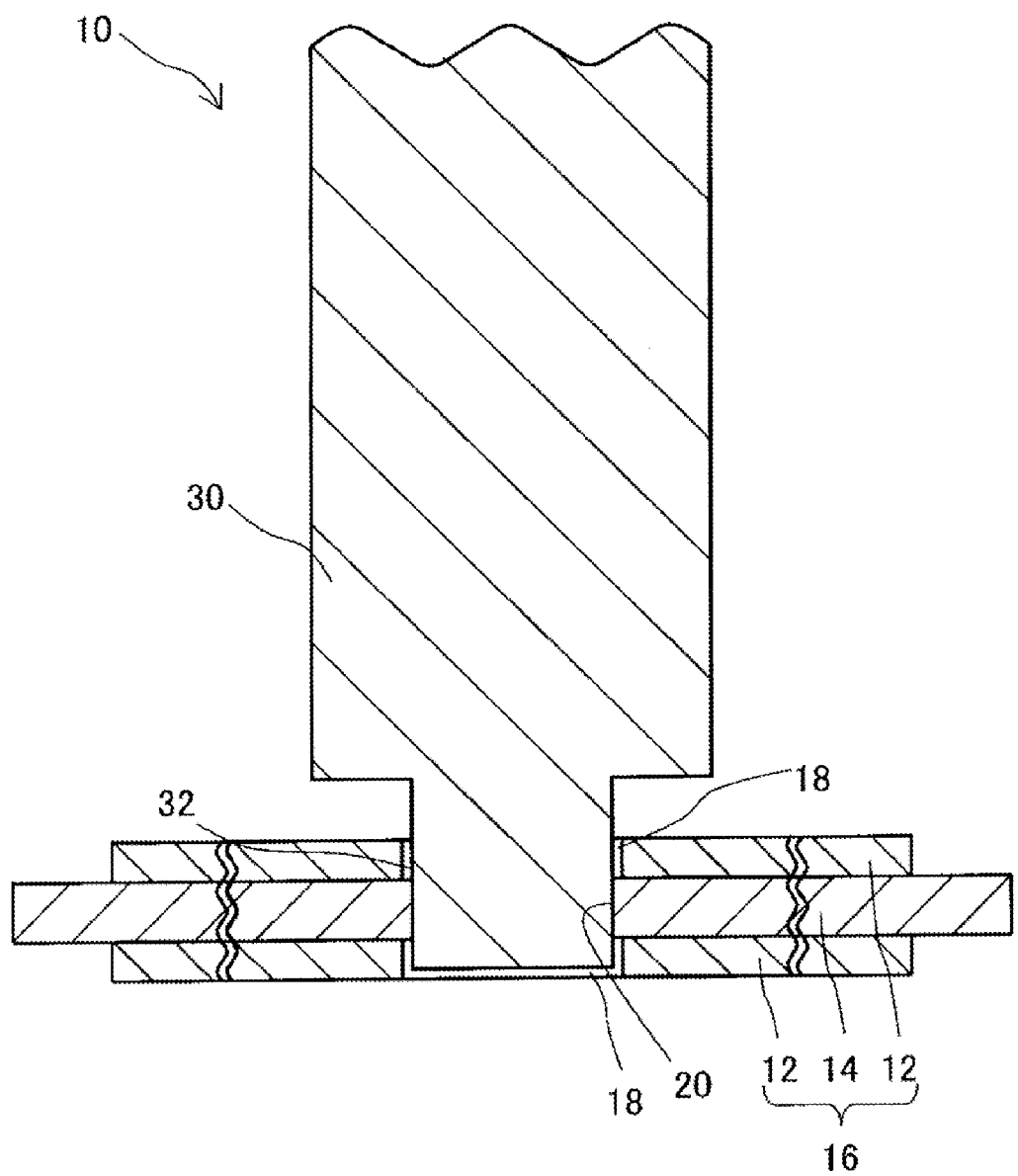
FIG. 2 is a sectional enlarged view of one example 1 of the driving member in accordance with one embodiment 1 of the present invention although some parts or elements are omitted.

In FIG. 2, the deformable thin plate 16 includes the elastic thin plate 14 and the flexible thin plate 14 that is rigidly fixed to each of the sides of the elastic thin plate 14.

The elastic thin plate 14 has a first through hole 20 formed in the center thereof, to which the lateral side portion 32 of the end of the driving shaft 30 is rigidly fixed.

The elastic thin plate 14 has the external shape, at least part of which is larger than the external shape of the flexible thin plate 12 in order to allow the voltage applying wires to be disposed thereon.

Each of the flexible thin plates 12, 12 has a second through hole 18 formed thereon and that is slightly larger than the first through hole 20 on the elastic thin plate 14. The second through holes 18, 18 formed on the respective flexible thin plates 12, 12 are centrally aligned with the first through hole 20 on the elastic thin plate 14 so that those through holes can communicate with each other.

Each of the flexible thin plate 12, 12 allows the voltage applying wires to be disposed thereon.

The driving shaft 30 is provided such that it cannot be protruded from the surface (the surface of the bottom side of the lower flexible thin plate 12) on the side opposite to the side on which the driving shaft 30 is rigidly fixed to the deformable thin plate 16.

In the embodiment 1, one of the through holes formed on the deformable thin plate 16, that is, the first through hole 20 on the elastic thin plate 14 is formed by the etching process so that it can simply pass through the elastic thin plate 14.

Figure 3:
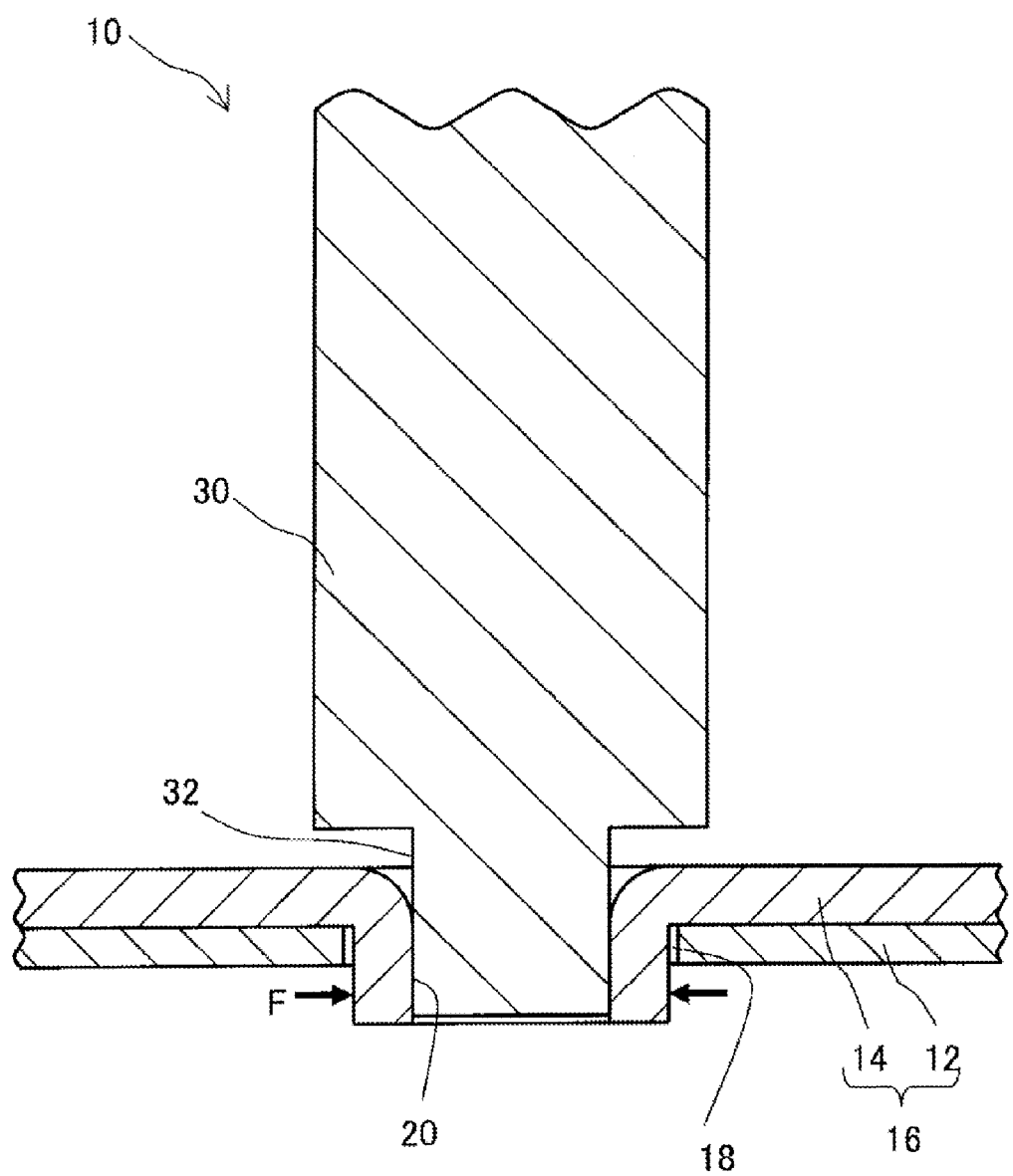
FIG. 3 is a sectional enlarged view of another example 2 of the driving member in accordance with one embodiment 1 of the present invention although some parts or elements are omitted.

As shown in an alternative example 2 in FIG. 3, however, it is preferred that the first through hole 20 may be formed on the elastic thin plate 14 so that it can be punched by the press process and have its edge folded and bent.

In the structure described above, the size of the inner side portion of the through hole on the deformable thin plate 16 in the direction of the thickness can be greater than the respective sizes in the embodiments shown in FIG. 1 and FIG. 2.

In this way, the lateral side portion 32 of the end (forward end) of the driving shaft 30 for fixing can be longer in the axial direction, and the driving shaft 30 can be fixed more firmly and more accurately.

In accordance with the structure shown in FIG. 3, furthermore, the elastic thin plate 14 can be exposed on the same level as the surface of the flexible thin plate 12 (the lower side surface in FIG. 3). By ensuring that the elastic thin plate 14 and the flexible thin plate 12 are to be electrically isolated, the wires can be disposed on the deformable thin plate 16 so that the voltage can only be applied from the surface side of the flexible thin plate 12 (the lower surface side in FIG. 3).

Although it is of course that the structure in the example 2 can be provided by the press fitting process, but it may also be provided in the manner to be described below, for example.

As a preliminary step, the first through hole 20 is formed by punching the elastic thin plate 14 by the press such that its inner diameter can be slightly greater than the external diameter of the lateral side portion 32 of the end (forward end) of the driving shaft 30.

Next, the end (forward end) of the driving shaft (30) including the lateral side portion 32 is inserted into the first through hole 20. Then, the edge of the first through hole 20 that has previously been folded and bent is deformed inwardly by applying a force F from the outside. The lateral side portion 32 of the driving shaft 30 is thus rigidly fixed.

The flexible thin plate 12 may be attached to the elastic thin plate 14 by any appropriate means.

This eliminates the need of press fitting the lateral side portion 32 of the fragile driving shaft 30. Thus, the driving shaft 30 can be manufactured easily.

(Embodiment 2)

The embodiment 2 of the present invention will be described below by referring to the appropriate figures in the accompanying drawings. It should be noted that those component parts or elements which are similar to those in the embodiment 1 are given like reference numerals. To avoid the duplicate description, the description of those parts or elements is omitted.

The driving member 10 in the embodiment 2 further includes an intervening thin plate 40 that is interposed between the inner side portion of the through hole on the deformable thin plate 16 and the corresponding lateral side portion 32 of the end of the driving shaft 30.

Figure 4:
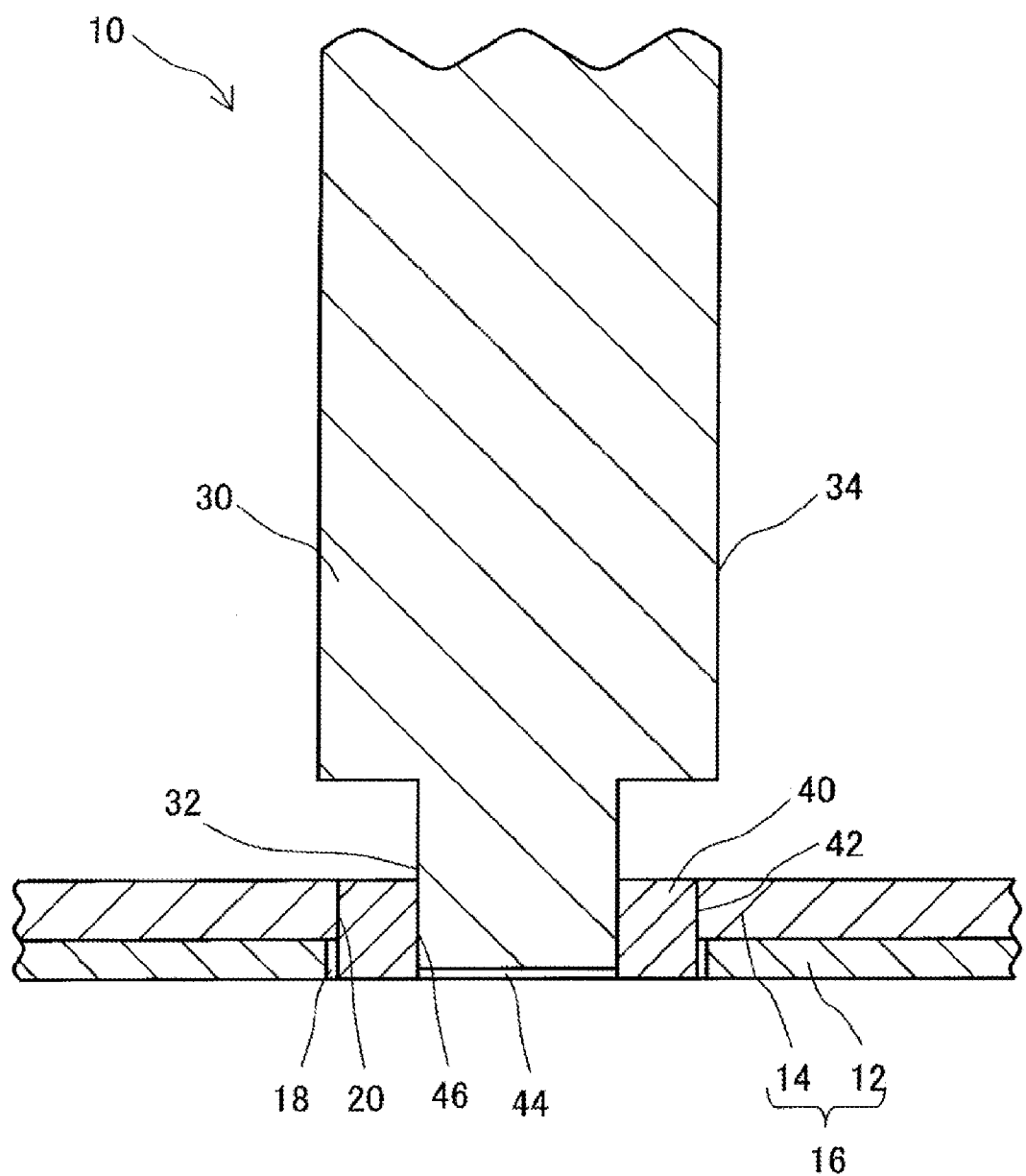
FIG. 4 is a sectional enlarged view of the driving member in accordance with another embodiment 2 of the present invention although some parts or elements are omitted.

In the structure according to the embodiment shown and described in FIG. 4, an intervening thin plate 40 is added to the structure shown in FIG. 1.

The intervening thin plate 40 may be made of any of the metallic material, the synthetic resin material, the ceramics material and the like.

The intervening thin plate 40 is provided so that its outer side portion 42 can be rigidly fixed to the inner side portion of the first through hole 20 on the elastic thin plate 14. The intervening thin plate 40 has a third through hole 44 formed thereon, and the lateral side portion 32 of the driving shaft 30 is rigidly fixed to the inner side portion 46 of the third through hole 44.

When the intervening thin plate 40 is to be rigidly fixed to the deformable thin plate 16, this fixing can occur by using the thickness of the elastic thin plate 14. In the embodiment 1 shown and described, the literal side portion 32 of the end (forward end) of the driving shaft 30 is also rigidly fixed to the deformable thin plate 16 by using the thickness of the elastic thin plate 14.

When the intervening thin plate 40 is rigidly fixed to the deformable thin plate 16, however, a greater external size can be provided, and they can be fixed over the greater area. Thus, those two thin plates can be fixed together more firmly and more accurately. As the result, therefore, the lateral side portion 32 of the driving shaft 30 can be fixed to the deformable thin plate 16 more firmly and more accurately.

As the size of the outer side portion 42 of the intervening thin plate 40 becomes greater, on the other hand, the intervening member that is required for transmitting the movement of the deformable thin plate 16 to the driving shaft 30 will become greater accordingly. This is not preferred from the fact that the driving amount that will be produced by the driving shaft 30 in the driving member 10 must be greater.

Desirably, the size of the outer side portion 42 of the intervening thin plate 40 should not be too large. In the example shown in FIG. 4, therefore, it is specified that the preferred external size of the intervening thin plate 40 should be smaller than the external size of the lateral side portion 34 located in the center of the driving shaft 30.

As the intervening thin plate 40 becomes thicker, the inner side portion 46 which engages the lateral side portion 32 of the driving shaft 30 will become larger. It is desired, therefore, that the intervening thin plate 40 should be thicker in order to ensure that the fixing can be more firm and more accurate.

It is not preferred, however, that the intervening thin plate 40 becomes thicker in order to ensure that a greater driving amount can be provided by the driving shaft 30. Considering the tradeoff between the two ideas, it is preferred that the intervening thin plate 40 and the deformable thin plate 16 have the equal thickness.

It is also preferred that the inner side portion 46 of the intervening thin plate 40 is thicker and that its outer side portion 42 is less thick.

The fixing of the end of the driving shaft 30 including the lateral side portion 32 to the intervening thin plate 40 and the fixing of the intervening thin plate 40 to the deformable thin plate 16 will occur in the same manner as for the embodiment 1 wherein the lateral side portion 32 of the driving shaft 30 is rigidly fixed to the deformable thin plate 16. Whether those thin plates are to be rigidly fixed by the press fitting process or otherwise or the order in which those thin plates are to be rigidly fixed is not important.

In the embodiment 2, the intervening thin plate 40 has the third through hole 44 formed thereon, but a blind hole may be formed instead of the though hole.

In this case, for example, the blind hole may have the coating of the adhesive agent previously applied at least on the bottom thereof. This ensures that the driving shaft 30 can be rigidly fixed more firmly. The part of the adhesive agent previously applied on the bottom of the blind hole and which is used for fixing the lateral side portion 32 of the driving shaft 30 to the corresponding inner side portion 46 of the blind hole has little effect on the driving capability provided by the driving shaft 30 in the driving member 10.

In the embodiment 2, the flexible thin plate 12 may be made of the material that can resist any possible damage caused by the flexible thin plate 12 touching the intervening thin plate 40. In this case, it is preferred that the second through hole 18 on the flexible thin plate 12 may have the size that is the same as the first through hole 20 on the elastic thin plate 14. Those through holes may be formed simultaneously by using any suitable method.

It is not required that the third through hole 44 on the intervening thin plate 40 and the end (forward end) of the driving shaft 30 including the lateral side portion 32 may have the same cross sectional shape. For example, the third through hole 44 may have the round shape while the end (forward end) of the driving shaft 30 including the lateral side portion 32 may have the polygonal shape in cross section. Then, the press fitting method may be used and the adhesive agent may be poured in any gap that exists between them. Conversely, the third through hole 44 may have the polygonal shape while the end (forward end) of the driving shaft 30 including the lateral side portion 32 may have the round shape in cross section. Then, the press fitting method may be used and the adhesive agent may be poured in any gap that exists between them. Similarly, it is not required that the through hole on the deformable thin plate 16 and the intervening thin plate 40 may have the same external shape.

In the embodiment 1 and the embodiment 2, the driving shaft 30 is made of any material of the carbon group, and there is the risk that the driving shaft 30 may be damaged when the end of the driving shaft 30 including the lateral side portion 32 is inserted through the through hole on the deformable thin plate 16.

The damage can be avoided by chamfering the forward end of the driving shaft 30 including the lateral side portion 32.

It is also preferred that this chamfering may be performed for the surface side of the first through hole 20 on the elastic thin plate 14 through which the driving shaft 30 is first inserted into the deformable thin plate 16 or for the surface side of the third through hole 44 on the intervening thin plate 40.

(Embodiment 3)

The embodiment 3 of the present invention will be described below by referring to the appropriate figures in the accompanying drawings. It should be noted that those component parts or elements which are similar to those in the embodiment 1 are given like reference numerals. To avoid the duplicate description, the description of those parts or elements is omitted.

Figure 5:
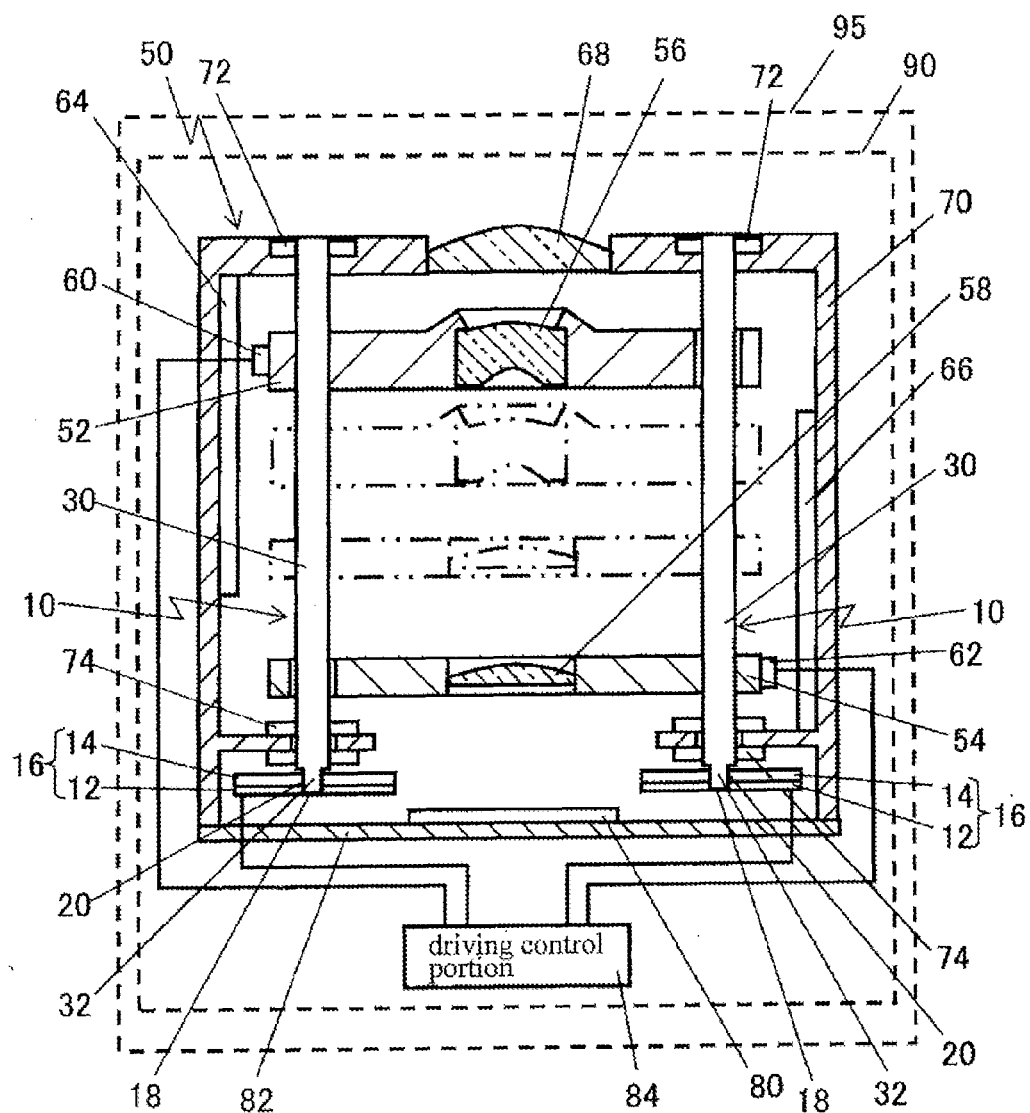
FIG. 5 is a sectional enlarged view of the linear driving device in accordance with still another embodiment 3 of the present invention although some parts or elements are omitted.
Figure 6:
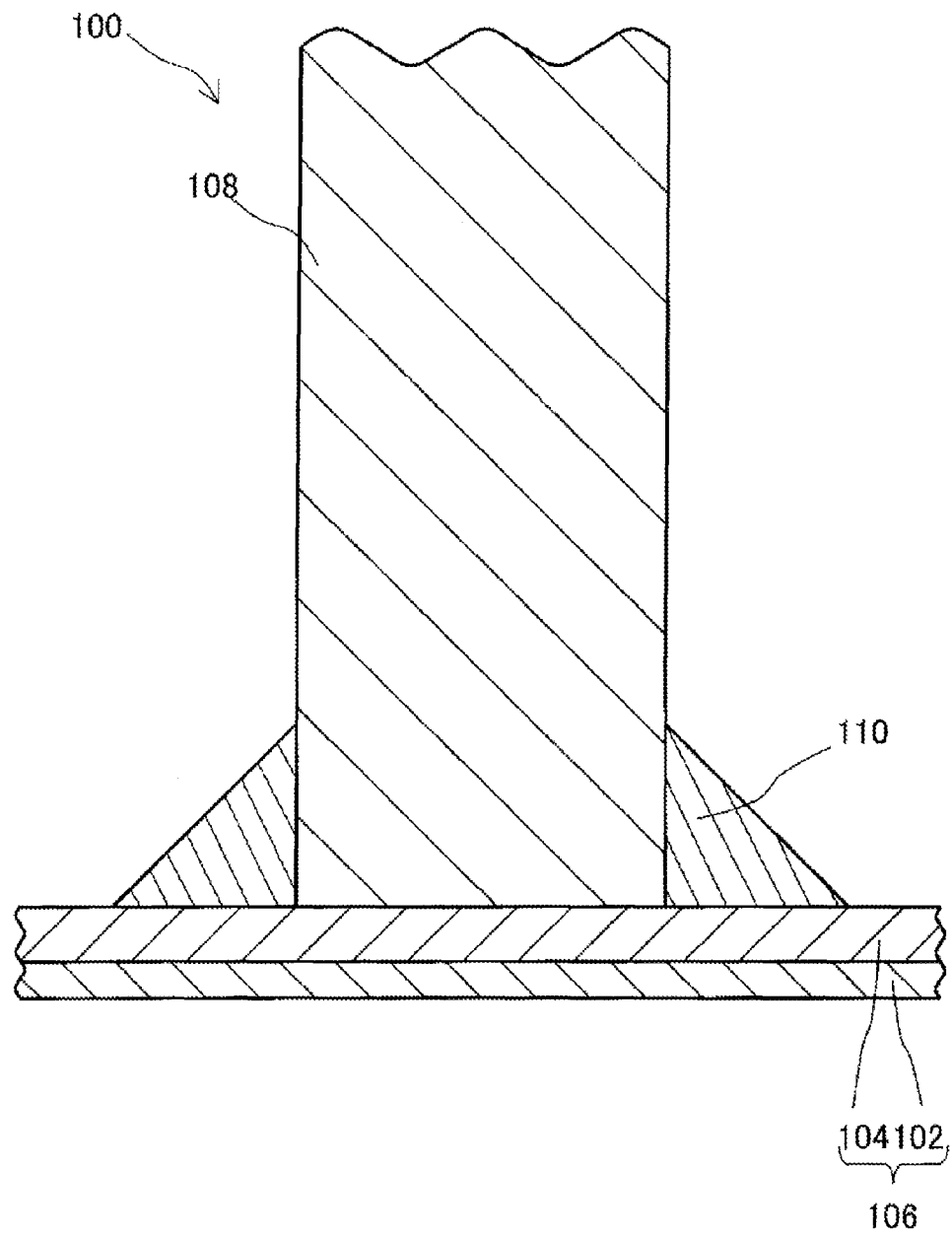
FIG. 6 is a sectional enlarged view of the prior art driving member.

As shown in FIG. 5, the embodiment 3 is provided for explaining a linear driving device 50 using the driving member 10 in the embodiments 1 and 2, a camera device 90 using the driving member 10 and an electronic device 95.

The lens driving device that includes the linear driving device 50 using the driving member 10 is used to drive the zooming lens and focusing lens in the camera device 90.

The camera device 90 may be incorporated in any one of the various types of the electronic device 95. As typical examples, the electronic device 95 includes the mobile terminal that is represented by the cellular or mobile phone, the smartphone and the like and the portable devices such as the hand-held personal computers and the like. It also includes the desktop devices such as the monitoring camera system.

The linear driving device 50 includes the respective driving members 10, 10, each of which has been described in the embodiments 1 and 2, and the respective lens supports 52, 54 that take the form of the moving body.

The driving members 10, 10 include the respective deformable thin plates 16, 16 and the respective driving shafts 30, 30.

The deformable thin plates 16, 16 include the respective flexible thin plates 12, 12 which expand and contract themselves under the applied voltage and the respective elastic thin plates 14, 14 having the respective flexible thin plates 12, 12 rigidly fixed to at least one side thereof. Like the embodiment shown and described in FIG. 1, the current embodiment shown has the flexible thin plate 12 rigidly fixed to the bottom side surface of the elastic thin plate 14.

The driving shafts 30, 30 are rigidly fixed to the corresponding deformable thin plates 16, 16 so that they can be displaced in the axial direction as they are operatively associated with the deformation of the respective deformable thin plates 16, 16.

The driving shafts 30, 30 are provided such that the lateral side portions 32, 32 of the ends of the driving shafts 30, 30 on the sides on which the driving shafts 30, 30 are rigidly fixed to the respective deformable thin plates 16, 16 can be rigidly fixed to the corresponding inner side portions of the through holes on the respective deformable thin plates 16, 16.

In the embodiment 3, it is assumed that the driving members 10, 10 are the same as the driving members 10, 10 in the embodiment 1 shown and described by referring to FIG. 1. It should be understood that any other forms of the driving member 10 can also be used.

The lens supports 52, 54 are frictionally coupled with the respective driving shafts 30, 30 so that they can be moved in the axial directions thereof by causing them to be displaced in the axial directions thereof.

The lens supports 52, 54 are provided for carrying the respective lenses 56, 58 through which the light received from an object (not shown) can be focused on the imaging elements 80.

In addition, the linear driving device 50 includes respective position sensors 60, 62 for sensing the axial position of the respective lens supports 52, 54 and respective scales 64, 66 associated with the corresponding position sensors 60, 62. The lens support 52, the position sensor 60 and the scale 64 together form the zooming lens set 56. The lens support 54, the position sensor 62 and the scale 66 together form the focusing lens set 58.

A casing 70 is the external housing for the linear driving device 50, and contains the component parts or elements such as the respective driving members 10, 10, the respective lens supports 52, 54 and the like that are arranged in their appropriate positions.

The casing 70 is made of the synthetic resin material, and has a hole for placing the lens 68 on the center of the object side and an opening for placing the substrate 82 having the imaging element 80 on the opposite side to the object side.

The light received from the object passes through the lenses 68, 56, 58 axially aligned with each other and is then focused onto the imaging element 80. The light received by the imaging element 80 is then converted into the corresponding electric signals which are provided to the camera device 90.

The description of the driving members 10, 10 is omitted because they have been described in the embodiments 1 and 2.

The driving members 10, 10 are housed in the casing 70 in such manner that the ends of the driving shafts 30, 30 on the side opposite to the side on which the driving shafts 30, 30 are rigidly fixed to the deformable thin plates 16, 16 and the areas in the neighborhood of the deformable thin plates 16, 16, can be rigidly fixed to the casing 70 by being pressed elastically and supported by the rubber bushings 72, 74 and 72, 74 from the outside. The deformable thin plates 16, 16 are provided so that they cannot make contact with the outside except for the driving shafts 30, 30 and the associated electrical power feeding components.

Therefore, since there are no attenuation of the vibrations due to contact with the external components, the driving shafts 30, 30 in the driving members 10, 10 can provide the great driving capability.

The ends of the driving shafts 30, 30 located on the side opposite to the sides on which the driving shafts 30, 30 are rigidly fixed to the respective deformable thin plates 16, 16 are fixed by adhering to the respective rubber bushing 72, 72, but the supporting areas in the neighborhood of the deformable thin plates 16, 16 will not adhere to the rubber bushings 74, 74.

The lens supports 52, 54 are disposed on the respective lateral side portions 34, 34 on the main centers of the driving shafts 30, 30 that are supported by the rubber bushings 72, 74 and 72, 74. The driving shafts 30, 30 will be assembled so that their respective axial directions can be aligned with the optical axial directions.

The lens supports 52, 54 are made of the synthetic resin material, and have respective holes on the centers thereof for accepting the lenses 56, 58 therein. The contact portions of the lens supports 52, 54 in contact with the driving shafts 30, 30 are made of any metallic material, and are frictionally coupled with the corresponding driving shafts 30, 30 by being urged by the spring means and the like toward the corresponding driving shafts 30, 30 so as to the line-to-line contact in cross section.

As the lens supports 52, 54 are simply frictionally coupled with the corresponding driving shafts 30, 30, they can move in the axial direction along the corresponding driving shafts 30, 30.

The lens support 52 is frictionally coupled with the driving shaft 30 on the left side in FIG. 5, and the lens support 54 is frictionally coupled with the driving shaft 30 on the right side in FIG. 5.

The sides opposite to the sides on which the lens supports 52, 54 are frictionally coupled with the corresponding driving shafts 30, 30 have the U shape, and engage the corresponding driving shafts 30, 30 so that the lens supports 52, 54 can be prevented from being rotated about the corresponding driving shafts 30, 30.

The position sensors 60, 62 are provided for sensing the axial positions of the corresponding lens supports 52, 54 and sending the outputs to a driving control portion 84. In the embodiment 3, MR sensors are provided on the corresponding lens supports 52, 54, and scales 64, 66 in the form of the magnetic scale are provided on a casing 70. The scales 64, 66 are provided such that the polarities are oriented toward the corresponding position sensors 60, 62 and are arranged alternately in the optical axis direction. It is preferred that the position sensors 60, 62 and the corresponding scales 64, 66 may be provided on the corresponding lens supports 52, 54 or may be provided on the casing 70. In the embodiment 3, the position sensors 60, 62 use the MR sensor, but it may be appreciated that the Hole sensor and the like may be employed. Depending on the type of the sensor employed, the scales 64, 66 may be omitted.

The driving control portion 84 is operated to receive the information concerning the axial position of the respective lens supports 52, 54 from the corresponding position sensors 60, 62, determine, based on that position information, the difference from the position up to which the respective lens supports 52, 54 should be moved, and apply the required voltage across the flexible thin plates 12, 12 in the driving members 10, 10.

The driving control portion 84 is operated to apply the repetitive waveform voltage across the respective flexible thin plates 12, 12 so that the respective lens supports 52, 54 can be moved. For example, the repetitive waveform may include the square waveform, the sawtooth waveform, and the triangular waveform that presents different rising time and falling time and the like.

When the square waveform voltage is applied, for example, the deformable thin plates 16, 16 will become deformed comparatively slowly against the elastic forces of the corresponding elastic thin plates 14, 14 until the deformable thin plates 16, 16 reach their deformation limit that corresponds to the predetermined voltage. Then, the driving shafts 30, 30 will also be displaced comparatively slowly in the axial direction, causing the lens supports 52, 54 frictionally coupled with the corresponding driving shafts 30, 30 to move together with the driving shafts 30, 30.

When the applied voltage is removed, the flexible thin plates 12, 12 will be restored to their original shapes and the elastic thin plates 14, 14 will also be restored to their respective original shapes under their own elastic forces, therefore, the deformable thin plates 16, 16 will be restored to their respective original shapes rapidly. Accordingly, the driving shafts 30, 30 will also be accelerated greatly and moved quickly back to their original positions. If this acceleration is greater than the frictional forces of the respective lens supports 52, 54 frictionally coupled with the corresponding driving shafts 30, 30, however, only the driving shafts 30, 30 will be moved slidably back to their original positions while the lens supports 52, 54 remain in those positions.

During one complete cycle, the lens supports 52, 54 will advance by one stroke of the corresponding driving shafts 30, 30. When the reverse voltage is applied, it will cause the lens supports 52, 53 to be moved backwardly.

The linear driving device 50 in the embodiment 3 includes the driving members 10, 10 described in the embodiment 1, and the lens supports 52, 54 in the form of the moving body and that are frictionally coupled with the corresponding driving shafts 30, 30 so that they can move in the axial direction along the driving shafts 30, 30 as the driving shafts 30, 30 be displaced in the axial direction thereof.

The driving shafts 30, 30 in the driving members 10, 10 described in the embodiment 1 will provide the great driving force and driving amount, respectively. As such, the driving force and the one stroke driving amount required for moving the lens supports 52, 54 in the form of the moving body and carrying the corresponding lenses 56, 58 in the linear driving device 50 can be greater. In other words, the lens supports 52, 54 that may be heavier can be moved with the higher speeds.

In particular, as the linear driving device 50 acts as the lens driving device on which the lenses 56, 58 can be mounted, it allows the lens supports 52, 54 carrying the greater size lenses to be moved with the higher speeds. The lenses 56, 58 provide brighter lights as they are diametrically larger, and the camera device 90 having the linear driving device 50 mounted therein can provide the brighter images in a shorter time. Additionally, the electronic device 95 having the camera device 90 mounted therein can provide the brighter images in a shorter time.

In the embodiment 3, it is supposed that the linear driving device 50 acts as the lens driving device for driving the zooming lens and/or the focusing lens. It should be understood that the present invention is not limited to the embodiment 3.

For example, the linear driving device 50 may be implemented as the driving device that is designed for use with the lens or the imaging element correcting camera shake so that it can drive the lens to move in the direction orthogonal to the optical axis direction or can drive the imaging element to move in the surface direction. In this case, the moving body may take the form of a lens support carrying the lens or an imaging element support carrying the imaging element for correcting camera shake.

What is claimed is:

1. A driving member which comprises:
    a deformable thin plate including a flexible thin plate capable of expanding and contracting itself under the applied voltage and an elastic thin plate having at least one side thereof rigidly fixed to said flexible thin plate; and
    a driving shaft having its one axial end rigidly fixed to said deformable thin plate and being capable of undergoing displacements which are operatively associated with the deformation of the deformable thin plate,
    wherein said driving shaft having said one axial end whose lateral side portion is rigidly fixed to an inner side portion of a through hole formed on said elastic thin plate.

2. The driving member as defined in claim 1, wherein the lateral side portion of said one end of said driving shaft is diametrically smaller than the lateral side portion located in the center portion of said driving shaft.

3. The driving member as defined in claim 1, wherein said driving shaft has one end thereof that is not protruding through the surface of the side opposite the side on which said driving shaft is rigidly fixed to said deformable thin plate.

4. A linear driving device that includes the driving member as defined in claim 1 and a movable member frictionally coupled with said driving member so that said movable member can be moved in the axial direction thereof as said driving shaft is displaced in the axial direction thereof.

5. The linear driving device as defined in claim 4, wherein said movable member is a lens support having a lens fixed thereto for focusing the light received from an object.

6. A camera device that includes a lens for focusing the light received from an object, the linear driving device as defined in claim 5, and an imaging element for sensing the light focused by said lens.

7. An electronic device that includes the camera device as defined in claim 6.

8. A driving member which comprises:
    a deformable thin plate including a flexible thin plate capable of expanding and contracting itself under the applied voltage and an elastic thin plate having at least one side thereof rigidly fixed to said flexible thin plate; and
    a driving shaft having its one axial end rigidly fixed to said deformable thin plate and being capable of undergoing displacements which are operatively associated with the deformation of the deformable thin plate;
    wherein said driving shaft having said one axial end whose lateral side portion is rigidly fixed to an inner side portion of a through hole formed on said deformable thin plate;
    wherein said through hole includes a first through hole formed on said elastic thin plate and a second through hole formed on said flexible thin plate, said first and second through holes communicating with each other and said first through hole being diametrically larger than said second through hole.

9. A driving member which comprises:
    a deformable thin plate including a flexible thin plate capable of expanding and contracting itself under the applied voltage and an elastic thin plate having at least one side thereof rigidly fixed to said flexible thin plate;
    a driving shaft having its one axial end rigidly fixed to said deformable thin plate and being capable of undergoing displacements which are operatively associated with the deformation of the deformable thin plate;
    wherein said driving shaft having said one axial end whose lateral side portion is rigidly fixed to an inner side portion of a through hole formed on said deformable thin plate; and
    an intervening thin plate interposed between the inner side portion of said through hole and the corresponding lateral side portion of said one end of said driving shaft.

* * * * *